United States Patent [19]

Fuchs

[11] Patent Number: 5,107,412
[45] Date of Patent: Apr. 21, 1992

[54] SERIES RESONANT INVERTER, FOR AN X-RAY GENERATOR

[75] Inventor: Peter Fuchs, Quickborn, Fed. Rep. of Germany

[73] Assignee: U.S. Philips Corporation, New York, N.Y.

[21] Appl. No.: 672,712

[22] Filed: Mar. 18, 1991

[30] Foreign Application Priority Data

Mar. 21, 1990 [DE] Fed. Rep. of Germany ....... 4009020

[51] Int. Cl.$^5$ .......................................... H02M 7/521
[52] U.S. Cl. ..................... 363/96; 363/136; 378/107
[58] Field of Search .......... 363/58, 96, 136; 378/101, 107

[56] References Cited

U.S. PATENT DOCUMENTS

| | | | |
|---|---|---|---|
| 4,442,483 | 4/1984 | Baumann et al. | 363/136 |
| 4,488,213 | 12/1984 | Buikema | 363/96 |
| 4,514,795 | 4/1985 | van der Zwartt | 363/139 |
| 4,638,138 | 1/1987 | Rosa et al. | 363/136 |
| 4,653,082 | 3/1987 | Tsuchiya | 363/98 |
| 4,713,220 | 12/1987 | Huynh et al. | 363/136 |
| 4,805,081 | 2/1989 | Chambers et al. | 363/96 |

FOREIGN PATENT DOCUMENTS 3046413 7/1982 Fed. Rep. of Germany .
3046767 7/1982 Fed. Rep. of Germany .

Primary Examiner—Jeffrey L. Sterrett
Attorney, Agent, or Firm—William Squire

[57] ABSTRACT

A series resonant circuit is coupled to a direct voltage source via two push-pull connected thyristors and diodes connected inverse-parallel there across. A zero-crossing detector generates a zero-crossing signal as soon as the thyristor ignition pulse current through the series resonant circuit drops below a given value after its zero crossing, and an ignition pulse generator which is controlled by the zero-crossing detector generates ignition pulses for the thyristors. To prevent unintended interruption of the inverter operation, a measuring device measures the time interval between an ignition pulse and the subsequent zero-crossing signal, a memory stores the time interval for normal operation, and a circuit generates an auxiliary zero-crossing signal when the measured time interval exceeds the stored time interval by more than a predetermined value.

8 Claims, 2 Drawing Sheets

SERIES RESONANT INVERTER, FOR AN X-RAY GENERATOR

FIELD OF THE INVENTION

The invention relates to a series resonant inverter, notably for an X-ray generator, comprising a series resonant circuit which can be coupled to a direct voltage source via at least two push-pull connected thyristors and diodes connected inverse-parallel thereto, and also comprising a zero-crossing detector which generates a zero-crossing signal as soon as the current through the series resonant circuit exceeds a given value after its zero crossing, and an ignition pulse generator which is controlled by the zero-crossing detector so as to generate ignition pulses for the thyristors.

Of interest is commonly owned copending application Ser. No. 566,738 entitled "Inverter Device" filed Aug. 13, 1990 in the name of G. Vogler.

BACKGROUND OF THE INVENTION

Series resonant inverters of this kind can be used in an X-ray generator for generating the high voltage as is known inter alia from DE-OS 30 46 413. However, they can also be used for driving the rotor of a rotary-anode X-ray tube or for generating the filament current of the X-ray tube. The thyristors are then conductive during each semi-oscillation of the current through the series resonant circuit. The electric power that can be generated by such an inverter is higher as the semi-oscillations succeed one another more closely.

The semi-oscillations cannot flow directly successively through the push-pull controlled thyristors, as appears from FIG. 1 which represents the variation in time of the current through the series resonant circuit. It is assumed that during the first (positive) semi-oscillation a thyristor is conducting. Subsequent to the zero crossing of the current, the diode connected inverse-parallel to the thyristor first takes over the reverse current and the ignited thyristor is no longer conducting. Due to the power delivered to the user, the negative semi-oscillation of the reverse current (denoted partly by a broken line in FIG. 1) has an amplitude which is lower than that of the positive semi-oscillation.

The thyristor which is active during the next semi-oscillation may be ignited only after the current through the previously conducting thyristor has crossed zero and when subsequently the so-called recovery time ($t_q$) required for decomposition of the charge carriers has elapsed.

For the recognition of the zero crossing use is made of a zero-crossing detector, usually a Schmitt trigger, which generates a zero-crossing signal as soon as the reverse current has dropped below a value $i_s$. This value $i_s$ must be high enough so as to prevent an interference signal superposed on the measurement signal from initiating premature generation of ignition pulses. In unfavorable circumstances, however, the load-dependent reverse current is smaller than the value $i_s$, so that no zero-crossing signal is generated. Consequently, no ignition pulse is generated for the next thyristor so that, when the series resonant inverter is used for generating the high voltage for an X-ray source, an X-ray exposure is prematurely interrupted and the patient being examined is exposed to an unnecessarily high radiation dose because the X-ray exposure must be repeated.

SUMMARY OF THE INVENTION

It is an object of the present invention to construct an inverter of the kind set forth so that even in the case of small reverse currents operation is not interrupted.

This object is achieved in accordance with the invention by means of a measuring device for measuring the time interval between an ignition pulse and the subsequent zero-crossing signal, a memory for storing this time interval for normal operation, and a circuit for generating an auxiliary zero-crossing signal when the measured time interval exceeds the stored interval by more than a predetermined value.

When a zero-crossing signal fails to appear after an ignition pulse, the time interval measured in the circuit in accordance with the invention exceeds the stored time interval increased by the predetermined value, so that an auxiliary zero-crossing signal is generated. In the ignition pulse generator this auxiliary signal initiates the generating of an ignition pulse in the same way as in the case of a normal zero-crossing signal.

An effective further version of the invention comprises a comparator which is activated when the measured time interval corresponds to the stored time interval, and also a resettable timer which succeeds the comparator and which serves to generate an auxiliary zero-crossing signal a defined period of time after activation of the comparator. The period of time whereby the measured time must exceed the stored time so as to generate the auxiliary zero-crossing signal is thus determined by the timer which is controlled by the comparator which compares the stored time and the measured time.

A preferred embodiment in accordance with the invention comprises a zero current detector for generating a zero current signal when the current through the series resonant circuit drops below a predetermined value, and a logic circuit which combines the output signals of the comparator and the zero current detector and controls the timer. This further version ensures that the auxiliary zero-crossing pulse is indeed generated exclusively when the (reverse) current through the series resonant circuit has become zero or has reached a very small value. This value can be substantially smaller than the value $i_s$. Protection against failures is achieved in that the auxiliary zero-crossing signal can be generated only if the zero current signal is present for the entire period of the timer.

IN THE DRAWING

The invention will be described in detail hereinafter with reference to the drawing. Therein FIG. 1 shows the variation in time of the resonant circuit current in a series resonant inverter, FIG. 2 shows a block diagram of the part of an X-ray generator for illustrating an embodiment of the invention, and FIG. 3 shows a control circuit used in the device shown in FIG. 2.

DESCRIPTION OF THE PREFERRED EMBODIMENTS

Figure 2:
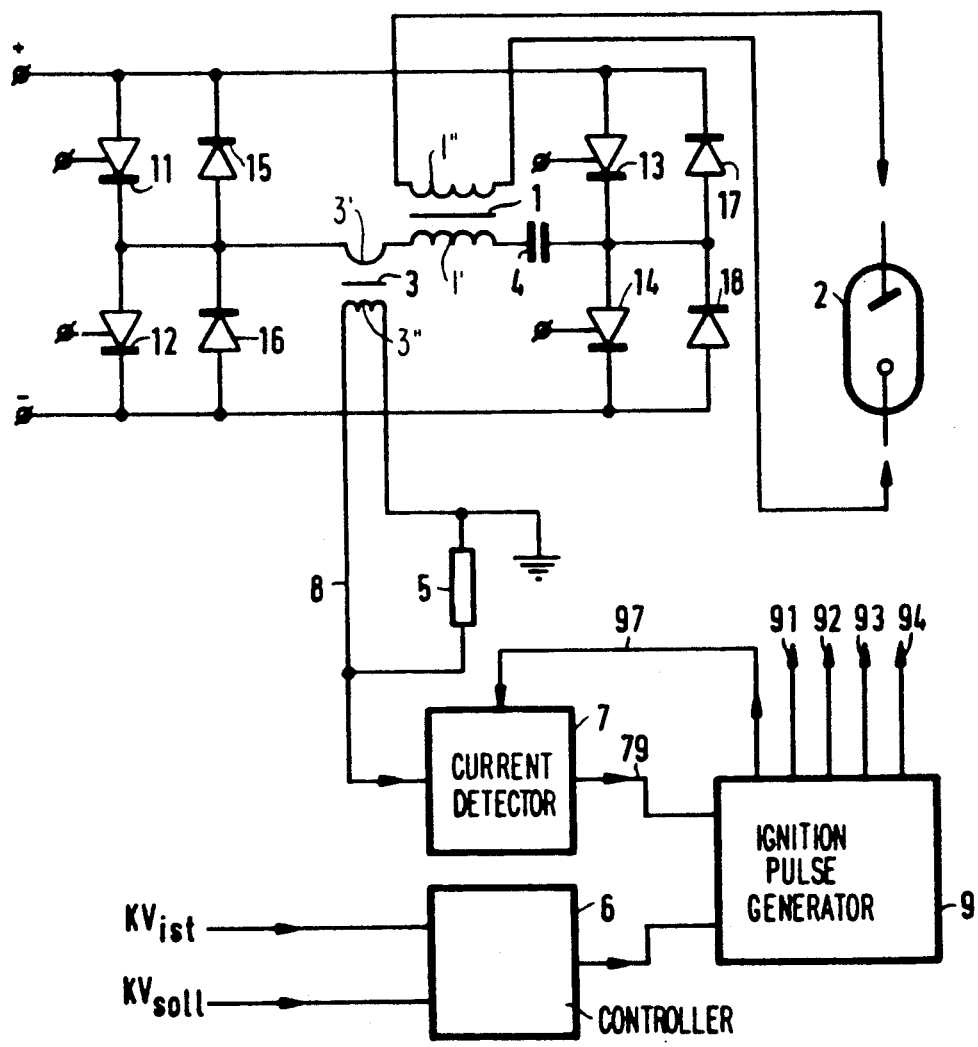

The fullwave-bridge series resonant inverter shown in FIG. 2 comprises two switching branches which are connected in parallel to the supply voltage terminals + and — and which consist of the series connection of two thyristors 11, 12 and 13, 14, respectively, a diode 15, 16 and 17, 18, respectively, being connected inverse-parallel across each thyristor. The junctions of the thyristors 11, 12 and 13, 14 are interconnected, via a bridge branch, which comprises the series connection of the respective primary windings 1' and 3' of a high-voltage transformer 1 for generating the high voltage for the X-ray tube 2 and a current transformer 3 for measuring the actual value of the current flowing through the bridge branch, and a capacitor 4. The high voltage at the secondary winding of the high-voltage transformer 1 is rectified, smoothed and applied to the X-ray tube 2 (in a manner not shown).

Due to the insulation required between the primary 1' and the secondary 1" windings of this transformer, a comparatively high stray inductance occurs, the inductance forming a series resonant circuit in conjuction with the capacitor 4. The thyristors 11 . . . 14 are push-pull ignited, so that during one phase the series resonant circuit is connected to the supply voltage via the thyristors 11, 14, while during the other phase it is connected thereto via the thyristors 12, 13.

A resistor 5 is connected to the secondary winding 3" of the current transformer 3. The voltage across this resistor is proportional to the instantaneous value of the current through the series resonant circuit formed by transformer 1 and capacitor 4. This voltage is applied to a current detector 7. Via a lead 79, the current detector 7 supplies control pulses for an ignition pulse generator 9 whose outputs 91 . . . 94 deliver ignition pulses for respective ones of the thyristors 11 . . . 14 and whose output 97 delivers a pulse whenever the diagonal branches 11, 14 and 12, 13 are ignited. This pulse is applied to the current detector 7.

There is also provided a controller 6 which compares (in a manner not shown) the actual value $KV_{ist}$ of the tube voltage with a reference value $KV_{soll}$ and which supplies the ignition pulse generator 9 with a signal whose magnitude is a control deviation manifested by the difference between those voltages.

The ignition pulse generator 9 is controlled by the controller 6 and the current detector 7. The ignition frequency of the control deviation measured by the controller 6 is determined by the generator 9. No ignition pulse is generated by generator 9 before the current detector 7 has indicated, via the lead 79, that the previously conducting thyristor branch is blocked.

Figure 3:
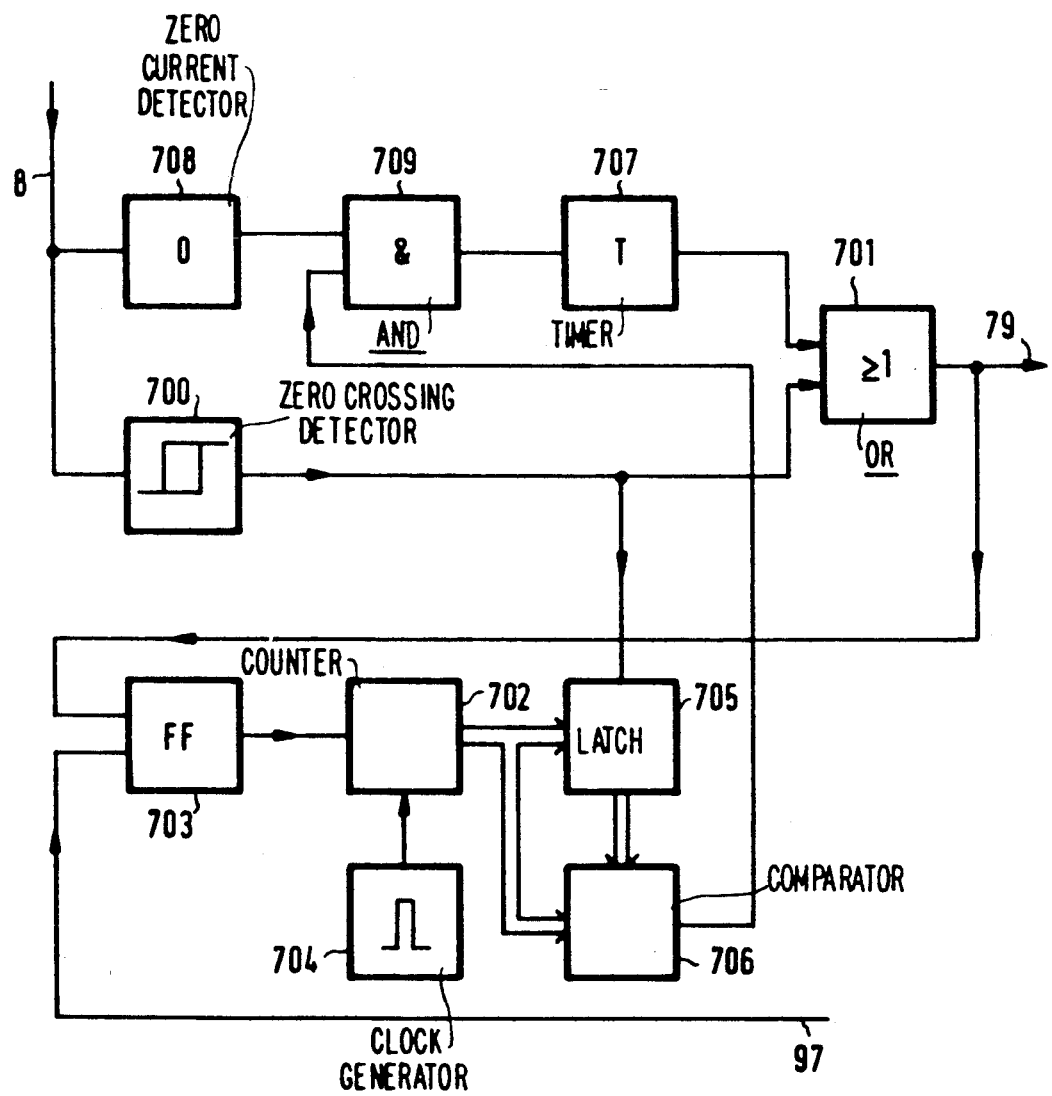

FIG. 3 illustrates the construction of the current detector 7. The detector 7 comprises a zero-crossing detector 700 which is coupled to the output lead 79 via an OR gate 701 and which, after an ignition pulse, generates a zero-crossing pulse whenever the resonant current reverses its polarity after having reached the value $i_s$. The construction of the current detector 7 described thus far is known from the state of the art.

In addition, an auxiliary zero-crossing pulse is generated whenever the amplitude of the reverse current does not exceed the value $i_s$, so that in such cases interruption of the X-ray exposure is prevented. To this end, the period of time elapsing between an ignition pulse and the subsequent zero-crossing pulse is measured and stored. This period is available for reference purposes and can be used to generate the auxiliary zero-crossing pulse after expiration of an additional safety period.

To achieve this, the detector 7 comprises a counter 702. This counter is controlled via a flip-flop 703 which is connected to the outputs 79, 97 at the input side. Each ignition pulse (on the lead 97) starts the counter 702 via the flip-flop 703, the counter counting the pulses of a clock generator 704. The zero crossing of each (auxiliary) zero-crossing pulse (on the lead 79) resets the counter. Under the control of the zero-crossing detector 700, a latch 705 takes over the counter position at the instant of occurrence of the leading edge of the zero-crossing pulse. Therefore, the counter position is a measure of the time elapsing between the ignition pulse and the zero-crossing pulse.

A comparator 706 compares the counter position stored in the latch 705 with the current counter position and is activated when the current counter position exceeds the stored counter position. A timer 707 which is connected subsequent to the comparator then generates an auxiliary zero-crossing signal after a defined time interval has elapsed, the auxiliary zero-crossing signal being applied to the output 79, via the OR gate 701, if the zero-crossing detector 700 fails to generate a zero-crossing signal, before that time.

In order to ensure that no auxiliary zero-crossing signal is generated when the thyristors are still conducting, there is provided a zero-current detector 708 whose input is connected to the lead 8. This detector may be a window discriminator whose output signal assumes a first state when the input signal is within a given range of the input voltage which is symmetrical with respect to the zero point, and assumes a second state when the input signal is outside that range. The range limits should be substantially lower than the value $i_s$ at which the zero-crossing detector 700 is activated. These range limits should correspond to a current in the series resonant circuit which is smaller than the hold current of the thyristors.

The outputs of the zero current detector 708 and the comparator 706 are connected to the timer 707 via an AND gate 709. The AND gate 709 acts on the timer 707 only if the comparator 706 has been activated without a zero-crossing pulse occurring in the time interval determined by the timer 707 and only if at the same time the input signal of the zero-current detector 708 remains within the input voltage given range during this time interval, so that the auxiliary zero-crossing signal is generated after expiration of the interval. However when either a zero-crossing signal is generated within the time interval or the input signal of the zero-current detector 708 at least temporarily exceeds that input voltage given range, the timer 707 is reset. Thus, a resettable timer must be used. It may also comprise, for example, a counter which counts the clock pulses of the clock pulse generator 704.

Figure 1:
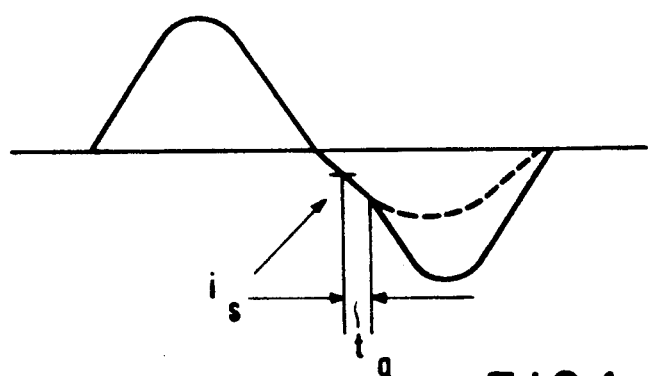

When the limits of the range of the zero current detector 708 are substantially lower than the value $i_s$, the output signal of the detector 708 may be influenced to a comparatively high degree by disturbances on the input. The effect of these disturbances on the auxiliary zero-crossing signal, however, are reduced in that an auxiliary zero-crossing signal is generated by the timer 707 only if the input voltage of the detector 708 remains within the given range during the time interval imposed by the timer 707. A suitable value for this time interval is from 20 to 30 μs (for a duration of the semi-oscillation (FIG. 1) of up to 100 μs). When the timer interval is chosen to be substantially longer, the auxiliary zero-crossing signal will be generated so late that the high voltage breaks down. However, if the time interval is chosen to be substantially shorter than the indicated value, the effect of disturbances will be stronger.

In the embodiment shown in FIG. 3 the current detector 7 is constructed so that the time interval between an ignition pulse and the zero-crossing pulse is measured for each zero-crossing pulse. In principle it would suffice if this time were stored in advance in the latch 705 of if it were measured and stored only after the first ignition pulse or at regular time intervals, for example after every fourth ignition pulse. However, these modifications reduce the accuracy of detection of the failure of a zero-crossing pulse with respect to the version shown in FIG. 3.

Analog components can be used instead of the digital components 702, 704 . . . 707. The time could then be measured by means of an integrator which receives a constant input voltage; in that case the latch 705 should be replaced by a sample-hold circuit. However, it is altlernatively possible to realize the entire circuit, with the exception of the components 700 and 708, by means of a suitably programmed microprocessor, the program being based on the procedure described with reference to FIG. 3.

The invention has been described with reference to a series resonant inverter for generating the high voltage of and X-ray tube. However, it can also be used for series resonant inverters which are used in an X-ray generator so as to generate the filament current for the X-ray tube or to drive a rotary anode, and also for series resonant inverters for applications other than the X-ray technique.

What is claimed is:

1. A series resonant inverter comprising:
a series resonant circuit;
two push-pull connected thyristor branches each including a plurality of thyristors and a diode connected inversely and in parallel across each thyristor, said branches for receiving a direct current voltage applied thereto, each branch connected to a different opposing side of said resonant circuit, the current through said resonant circuit passing through zero subsequent to the ignition of said thyristors;
zero crossing detector means coupled to said resonant circuit for generating a first zero-crossing signal when the current through the resonant circuit exceeds a given value after its zero crossing; and
ignition pulse generator means coupled to the zero crossing detector means responsive to said zero-crossing signal applied thereto for generating an ignition pulse for each said thyristors;
said zero crossing detector means comprising:
means for generating a time interval signal manifesting the value of a measured time interval between an ignition pulse and the subsequent zero-crossing of said current;
memory means responsive to said time interval signal for storing said time interval as a reference value; and
means responsive to the stored time interval value and to a subsequently occurring time interval signal applied thereto for generating an auxiliary zero-crossing signal when the time interval value of said subsequently occurring time interval signal exceeds the time interval value of said stored reference value by more than a predetermined amount.

2. A series resonant inverter as claimed in claim 1 wherein said means for generating said auxiliary zero-crossing signal comprises comparator means activated to produce an output when the measured time interval value corresponds to the stored time interval value, and a resettable timer responsive to the comparator means output and which serves to generate said auxiliary zero-crossing signal a defined period of time after activation of the comparator means.

3. A series resonant inverter as claimed in claim 2 wherein said detector means comprises a zero current detector responsive to the current through said series resonant circuit for generating a zero current signal when the current through the series resonant circuit drops below a predetermined value, and logic means which in response to the output signals of the comparator means and the zero current detector applied thereto controls the resettable timer.

4. A series resonant inverter as claimed in claim 3 wherein said means for generating a time interval signal comprises a counter for counting clock pulses between an ignition pulse and the subsequent zero-crossing signal.

5. A series resonant inverter as claimed in claim 2 wherein said means for generating a time interval signal comprises a counter for counting clock pulses between an ignition pulse and the subsequent zero-crossing signal.

6. A series resonant inverter as claimed in claim 1 wherein the means for generating a time interval signal comprises a counter for counting clock pulses between an ignition pulse and the subsequent zero-crossing signal.

7. The series resonant inverter of claim 1 wherein said means for generating said time interval signal includes count means for generating a count signal manifesting said measured time interval, said memory means including means responsive to said first zero crossing signal for storing said count signal.

8. A series resonant inverter comprising:
a series resonant circuit;
at least two push-pull connected thyristor branches each including a plurality of thyristors each responsive to a corresponding ignition pulse and a diode connected inversely and in parallel across each thyristor, said branches for receiving a direct current voltage applied thereto, at least one branch connected to a different opposing side of said resonant circuit, said ignition pulse causing a current to flow through the resonant circuit which current passes through zero subsequent to the ignition of the corresponding thyristors of said branches;
zero crossing detector means coupled to said resonant circuit for generating a first zero-crossing signal when the current through the resonant circuit passes through its zero crossing; and
ignition pulse generator means coupled to the zero crossing detector means responsive to said zero-crossing signal applied thereto for generating an ignition pulse for each said thyristors;
said zero crossing detector means comprising:
means for generating a first time interval signal manifesting the value of the time interval between an ignition pulse and the subsequent zero-crossing of the current corresponding to that ignition pulse; and
means responsive to the generated time interval value of at least one subsequently generated time interval signal for generating an auxiliary zero-crossing signal when the difference in value of the first time interval signal and the at least one subsequently occurring time interval signal exceeds the value of said first time interval by more than a predetermined amount.

* * * * *